US012689197B2

(12) United States Patent
Hu et al.

(10) Patent No.: US 12,689,197 B2
(45) Date of Patent: Jul. 21, 2026

(54) POWER SUPPLY WIRING APPARATUS

(71) Applicant: Zhuhai Shengchang Electronics Co., Ltd., Zhuhai City (CN)

(72) Inventors: JiaLong Hu, Zhuhai City (CN); Dehua Zheng, Zhuhai City (CN)

(73) Assignee: Zhuhai Shengchang Electronics Co., Ltd., Zhuhai City (CN)

( * ) Notice: Subject to any disclaimer, the term of this patent is extended or adjusted under 35 U.S.C. 154(b) by 215 days.

(21) Appl. No.: 18/612,670

(22) Filed: Mar. 21, 2024

(65) Prior Publication Data

US 2025/0253631 A1    Aug. 7, 2025

(30) Foreign Application Priority Data

Feb. 6, 2024    (CN) .......................... 202420286857.3

(51) Int. Cl.
H02G 3/00        (2006.01)
H02G 3/08        (2006.01)
(52) U.S. Cl.
CPC .................................. H02G 3/081 (2013.01)
(58) Field of Classification Search
CPC ..................................................... H02G 3/081
See application file for complete search history.

(56) References Cited

FOREIGN PATENT DOCUMENTS

| CN | 104538909 A | 4/2015 | |
| CN | 113809703 A | 12/2021 | |
| CN | 115117820 A | * 9/2022 | ............. H02G 3/121 |

OTHER PUBLICATIONS

Ruan et al. (CN 214379877U; published in 2021). (Year: 2021).*

* cited by examiner

*Primary Examiner* — Pete T Lee

(57)                ABSTRACT

The application relates to a power supply wiring apparatus. A panel is disposed as a structure that may slide up and down relative to a base, and a wire and/or a connector cap are/is neatly disposed in a box cavity between the panel and the base; for the power supply wiring apparatus of the application, the distance between the panel and the base may be adjusted according to the depth of a wiring box, so as to adapt to wiring boxes of different depth sizes, which ensures that the power supply wiring apparatus may be installed in the wiring box together with a dimmer supply power, meanwhile, the capacity of the box cavity between the base and the panel may be adjusted according to actual wiring needs, which ensures that the wire and connector cap may be completely placed in the box cavity.

6 Claims, 5 Drawing Sheets

POWER SUPPLY WIRING APPARATUS

CROSS-REFERENCE TO RELATED APPLICATIONS

This application claims priority to Chinese Patent Application No. 202420286857.3, filed on Feb. 6, 2024, which is incorporated herein by reference in its entirety.

TECHNICAL FIELD

The application relates to the technical field of electrical devices, in particular to a power supply wiring apparatus.

BACKGROUND

A wiring box is indispensable when a dimmer supply power is installed, most of existing wiring boxes have fixed use space, and the capacity of the wiring box cannot be adjusted, which cause some problems: if the space is small, a wire and a connector cap cannot be plugged into the wiring box completely, so that the power supply is difficult to install, and if the space is large, wiring in the wiring box is difficult to limit, so that messy wiring occurs.

SUMMARY

In order to achieve the purpose, the application provides a power supply wiring apparatus, which includes a base and a panel.

The base is fixedly installed on a rear shell of a power supply.

The panel slidably covers the base, a wiring hole is formed in the panel, and a box cavity is formed between the panel and the base.

A sliding kidney-shaped hole along the vertical direction is disposed on the side wall of the base, an installing post is disposed on the panel, and the installing post may penetrate into the sliding kidney-shaped hole and is closely matched with the sliding kidney-shaped hole.

In some possible embodiments, the outer diameter size of the installing post is greater than or equal to the width size of the sliding kidney-shaped hole.

In some possible embodiments, two sliding kidney-shaped holes are available, which are respectively disposed on two opposite side walls of the base in a staggered mode.

In some possible embodiments, limiting holes are formed in both the upper end and the lower end of the sliding kidney-shaped hole, and the aperture of the limiting hole is greater than the width size of the sliding kidney-shaped hole and also greater than the outer diameter size of the installing post.

In some possible embodiments, a turnover cover is hinged on the panel, and the turnover cover may rotate relative to the panel until it is covered horizontally or opened vertically with the panel.

In some possible embodiments, a hinge hole is formed in the panel, a hinge column which may be disposed in the hinge hole in a penetrating mode is disposed on the turnover cover, an inner protrusion is formed on the upper portion of the panel, and the turnover cover may rotate till being horizontally lapped on the inner protrusion.

In some possible embodiments, a partition plate is disposed in the middle of the panel, two spaced limiting grooves are disposed in the partition plate, a limiting protrusion is disposed at the end, close to the partition plate, of the turnover cover, the limiting protrusion may rotate between the two limiting grooves along with the turnover cover, and the limiting protrusion is pressed to generate elastic deformation in the rotating process.

In some possible embodiments, two turnover covers are available, which are symmetrically disposed on two sides of the partition plate, respectively, one semi-circular gap is formed at one end of the turnover cover, the other semi-circular gap is formed in the panel, and the two semi-circular gaps define the wiring hole after the turnover cover rotates to the horizontal state.

Compared with the relevant art, the application has the beneficial effects that: according to the power supply wiring apparatus of the application, the panel is disposed as a structure that may slide up and down relative to the base, and a wire and/or a connector cap are/is neatly disposed in the box cavity between the panel and the base; for the power supply wiring apparatus of the application, the distance between the panel and the base may be adjusted according to the depth of the wiring box, so as to adapt to wiring boxes of different depth sizes, which ensures that the power supply wiring apparatus may be installed in the wiring box together with a dimmer supply power, meanwhile, the capacity of the box cavity between the base and the panel may be adjusted according to actual wiring needs, which not only ensures that the wire and connector cap may be completely placed in the box cavity, but also may limit the wire in the box cavity through match of the panel with the base, so as to ensure neat wiring of the box cavity.

BRIEF DESCRIPTION OF THE DRAWINGS

In order to describe the technical solutions in the embodiments of the application more clearly, the drawings required to be used in description of the embodiments will be simply introduced below, obviously, the drawings described below are only some embodiments of the application, and other drawings can further be obtained by those of ordinary skill in the art according to the drawings without creative work.

Figure 1:
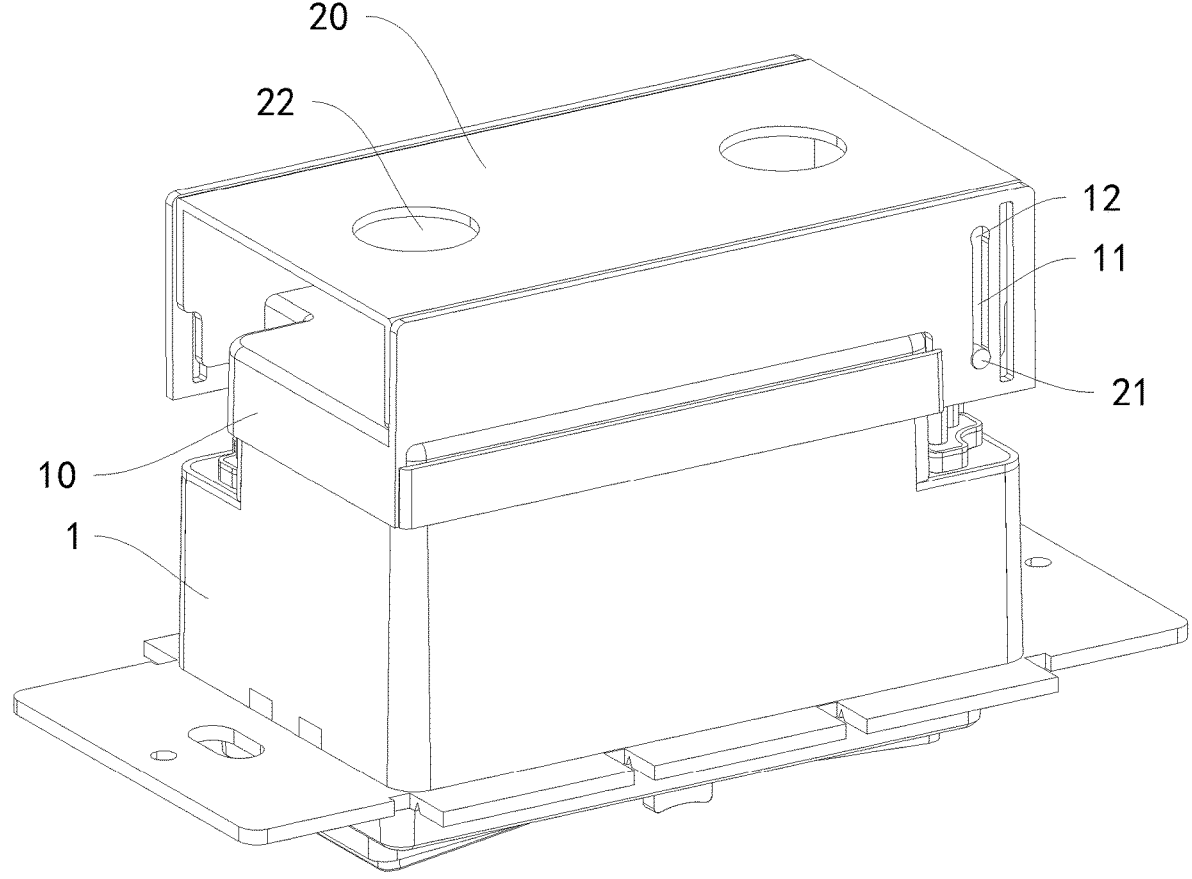
FIG. 1 is a schematic structure diagram of a three-dimensional view of a power supply wiring apparatus provided by Embodiment I of the application.

Description of Reference Numerals: Rear shell of a power supply 1, Wiring box 2, Base 10, Sliding kidney-shaped hole 11, Limiting hole 12, Panel 20, Installing post 21, Wiring hole 22, Hinge hole 23, Inner protrusion 24, Partition plate 25, Limiting groove 26, Turnover cover 30, Hinge column 31, and Limiting protrusion 32.

DETAILED DESCRIPTION OF THE EMBODIMENTS

The technical solutions in the embodiments of the application are clearly and completely described below in conjunction with the accompanying drawings in the embodiments of the application. Apparently, the embodiments described are only a part rather than all of the embodiments of the application. All other embodiments obtained by those of ordinary skill in the art based on the embodiments of the application without creative efforts shall fall within the protection scope of the application.

In the following, terms "first" and "second" are only adopted for description and should not be understood to indicate or imply relative importance or implicitly indicate the number of indicated technical features. Therefore, a feature defined by "first" and "second" may explicitly or implicitly indicate inclusion of at least one such feature. In the description of the embodiment of the application, "a plurality of" means two or more, unless otherwise specified.

As shown in FIGS. 1-5, a power supply wiring apparatus is disposed on a dimmer supply power, and is fixedly installed in a wiring box 2 together with the dimmer supply power. The power supply wiring apparatus of the application includes a base 10 and a panel 20, the base 10 may be fixedly installed on a rear shell of a power supply 1 of the dimmer supply power in a buckling or threading mode, the panel 20 slidably covers the base 10 with a box cavity formed therebetween, the panel 20 slides relative to the base 10 for adjusting the capacity of the box cavity, a wiring hole 22 is further formed in the panel 20, during use, a wire may be neatly distributed in the box cavity, then the distance between the panel 20 and the base 10 is adjusted, so that the inner side face of the panel 20 may play a limiting role on the distributed wire, thus avoiding the problem of messy wiring in the box cavity. Specifically, a sliding kidney-shaped hole 11 along the vertical direction is disposed on the side wall of the base 10, an installing post 21 is disposed on the panel 20, the installing post 21 may penetrate into the sliding kidney-shaped hole 11 and is closely matched with the sliding kidney-shaped hole 11, when the panel 20 is adjusted, the panel 20 is pulled by hand or pressed, so that the panel 20 moves up and down vertically relative to the base 10 for adjusting the distance therebetween (namely, the capacity of the box cavity), in the process that the panel 20 moves relative to the base 10, the sliding kidney-shaped hole 11 plays a guide role on the installing post 21, after external force is withdrawn, the movement of the panel 20 relative to the base 10 may be limited through friction force between the installing post 21 and the inner wall of the sliding kidney-shaped hole 11, so that the wire is always limited in the box cavity with fixed space size, in specific use, first, the wire is neatly distributed on the base 10, then the panel 20 covers the base 10 and the installing post 21 on the panel 20 slides in the sliding kidney-shaped hole 11 till the inner side of the panel 20 abuts to or is close to the distributed wire, and then the power supply wiring apparatus is installed in the wiring box 2 together with the dimmer supply power.

In some possible embodiments, the outer diameter size of the installing post 21 is greater than or equal to the width size of the sliding kidney-shaped hole 11, so that sufficient friction is generated between the installing post 21 and the sliding kidney-shaped hole 11 to overcome/counteract acting force of the wire on the panel 20. It is to be understood that in order to ensure that a user may apply force to enable the panel 20 to move relative to the base 10, the outer diameter size of the installing post 21 should not be too large, one of the practical situations is that if the outer diameter size of the installing post 21 is a, and the width size of the sliding kidney-shaped hole 11 is b, then $b \leq a \leq 1.05b$ should be satisfied.

Figure 2:
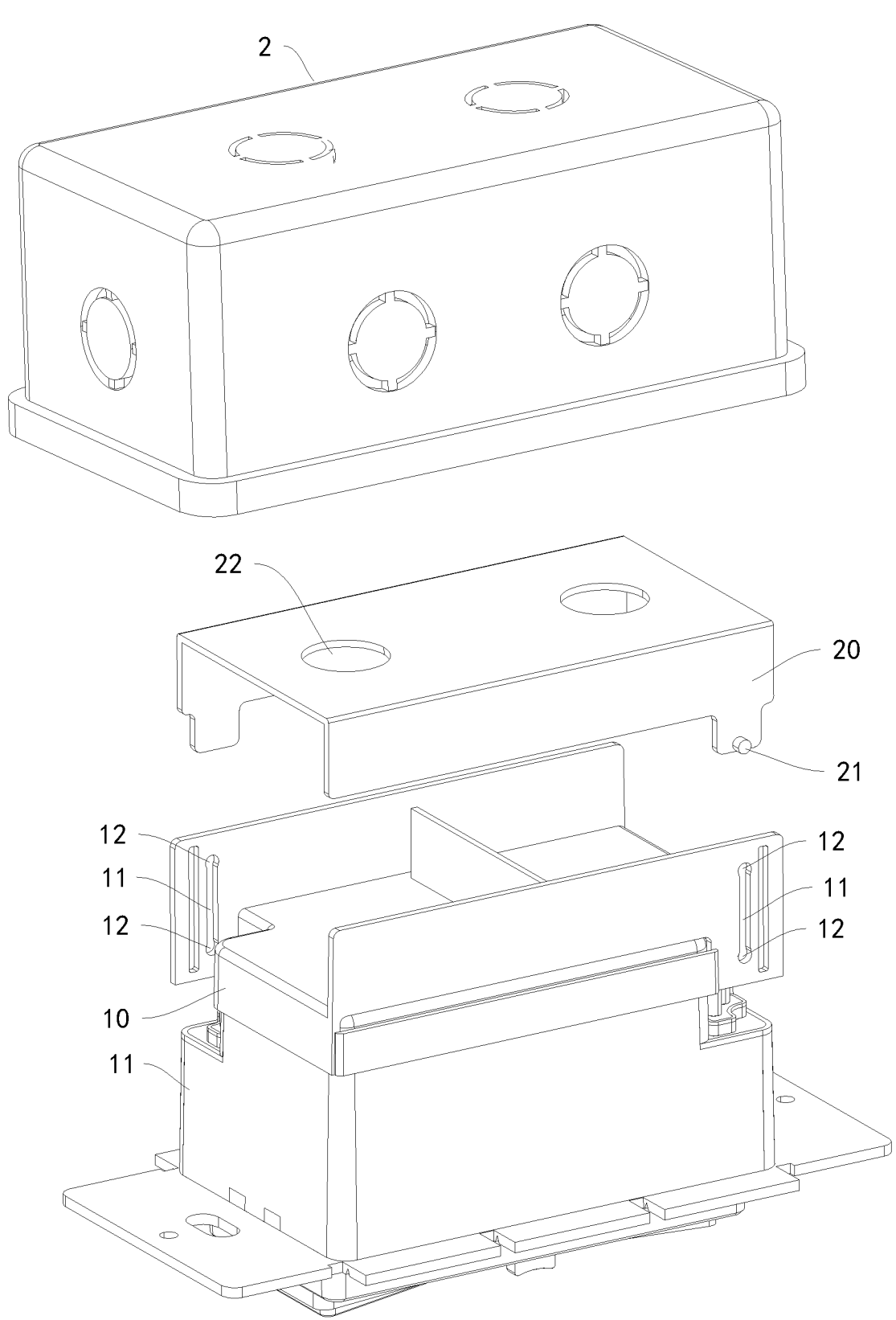
FIG. 2 is an assembly structure diagram of a three-dimensional view of a power supply wiring apparatus provided by Embodiment I of the application.
Figure 4:
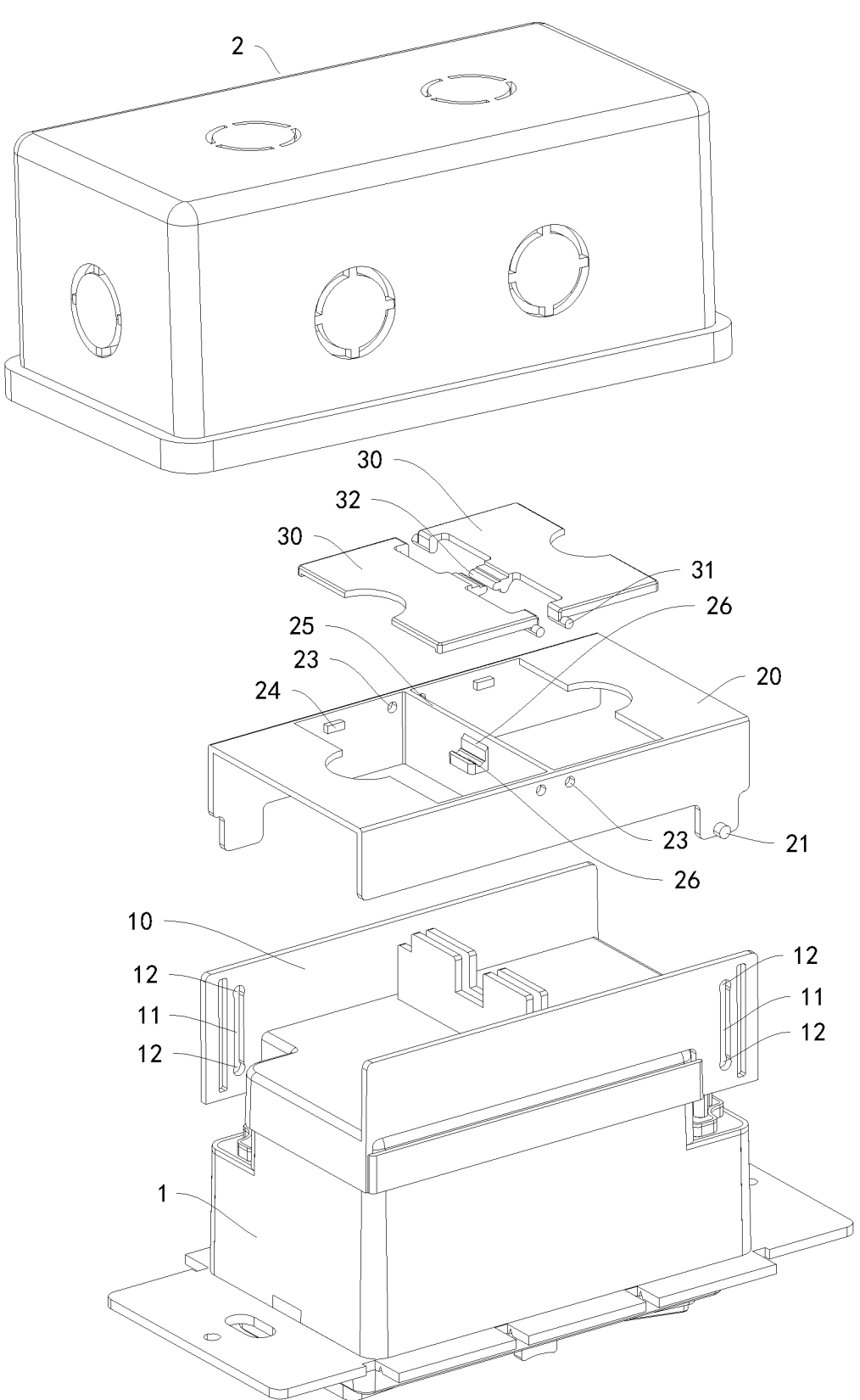
FIG. 4 is an assembly structure diagram of a three-dimensional view of a power supply wiring apparatus provided by Embodiment II of the application.

In some possible embodiments, referring to FIGS. 2 and 4, two sliding kidney-shaped holes 11 are available, which are respectively disposed on two opposite side walls of the base 10 in a staggered mode. It is to be understood that two installing posts 21 are also available, which penetrate into the two sliding kidney-shaped holes 11 correspondingly, in the embodiment, in order to guarantee horizontal and transverse balance of the panel 20 relative to the base 10, the installing posts 21/sliding kidney-shaped holes 11 are disposed on two opposite sides, while staggered arrangement may ensure horizontal and vertical balance of the two, namely, with the adoption of the structure of the embodiment, the numbers of the installing posts 21 and the sliding kidney-shaped holes 11 may be reduced, then the friction resistance between the panel 20 and the base 10 may be conveniently controlled and designed, meanwhile, materials are saved, and cost is reduced.

In some possible embodiments, referring to FIGS. 2 and 4, limiting holes 12 are formed in both the upper end and the lower end of the sliding kidney-shaped hole 11, the aperture of the limiting hole 12 is greater than the width size of the sliding kidney-shaped hole 11 and also greater than the outer diameter size of the installing post 21, namely, when the panel 20 is relative to the upper extreme position and the lower extreme position of the base 10, limiting of the panel 20 relative to the base 10 may be realized even without deformation due to extrusion of the installing post 21/sliding kidney-shaped hole 11, and therefore, when the use state is in the two positions, the service life of the power supply wiring apparatus may be prolonged.

Figure 3:
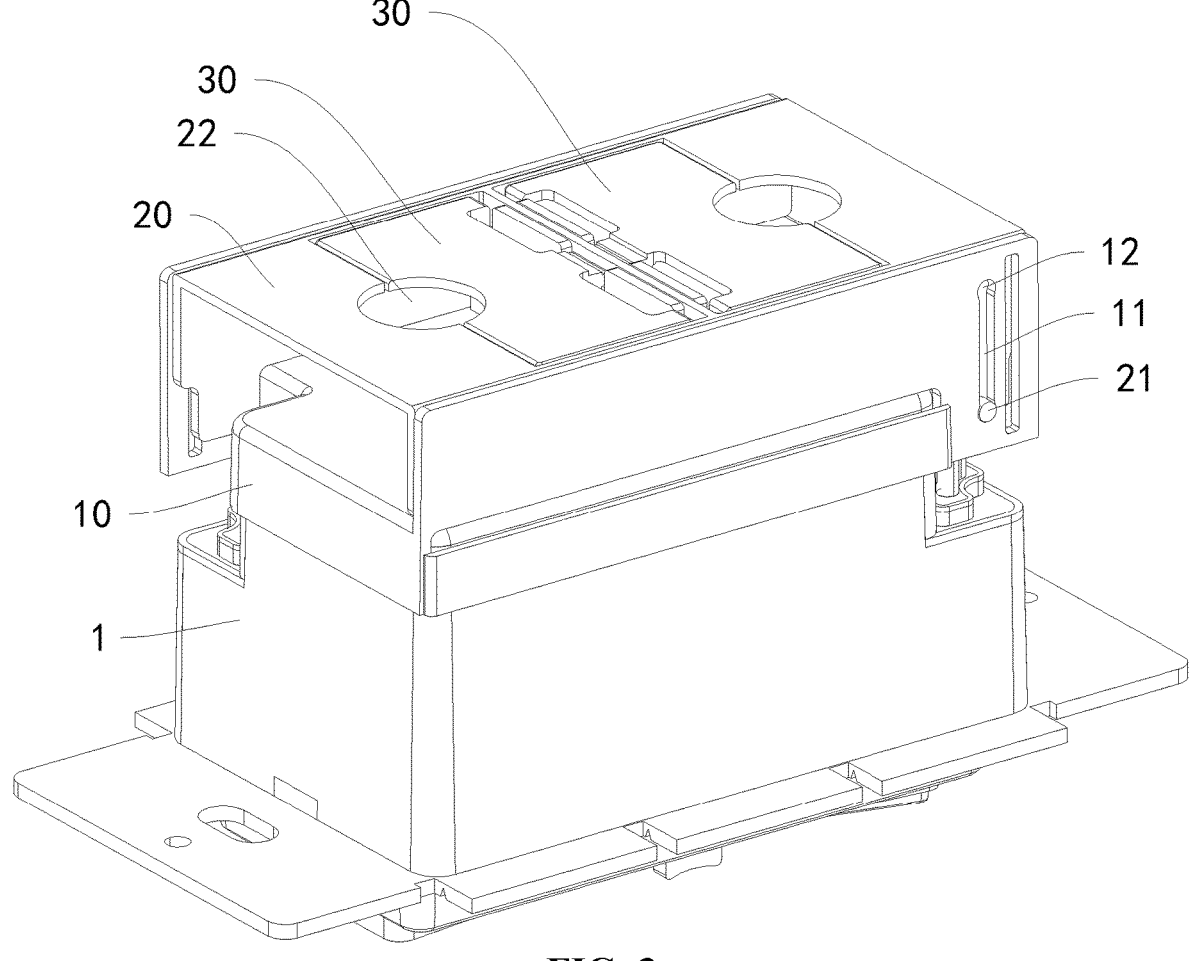
FIG. 3 is a schematic structure diagram of a three-dimensional view of a power supply wiring apparatus provided by Embodiment II of the application.
Figure 5:
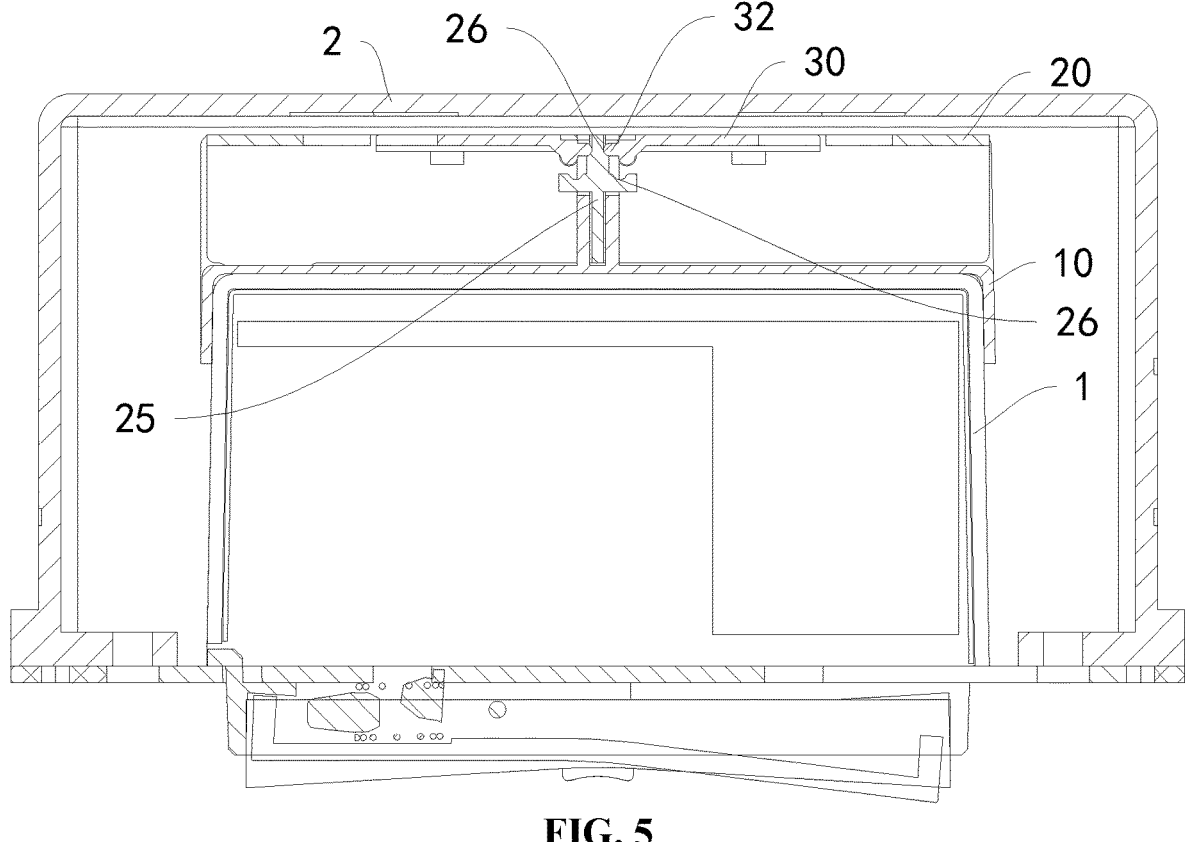
FIG. 5 is structure diagram of a cross-sectional view of a power supply wiring apparatus provided by Embodiment II of the application.

In some possible embodiments, referring to FIGS. 3-5, the difference between the embodiment and the above embodiment is that a turnover cover 30 is hinged on the panel 20, and the turnover cover 30 may rotate relative to the panel 20 until it is covered horizontally or opened vertically with the panel 20. The embodiment has the advantage that after the turnover cover 30 is opened, a worker may conveniently arrange a wire in the box cavity, and after wiring, the turnover cover 30 is rotated till the horizontal covering state, so that the wiring apparatus/power supply is attractive. Specifically, a hinge hole 23 is formed in the panel 20, a hinge column 31 which may be disposed in the hinge hole 23 in a penetrating mode is disposed on the turnover cover 30, an inner protrusion 24 is formed on the upper portion of the panel 20, the turnover cover 30 may rotate till being horizontally lapped on the inner protrusion 24, in order to ensure rotating balance of the turnover cover 30 relative to the panel 20, it is to be understood that the hinge columns 31 are respectively disposed on two opposite sides of the turnover cover 30, the inner protrusion 24 is disposed on the inner side of the panel 20 and has a certain distance with the hinge hole 23, namely, when the turnover cover 30 is in the horizontal state, the hinge hole 23 matches with the hinge post 31 to support one end of the turnover cover 30, and the inner protrusion 24 supports the other end of the turnover cover 30.

In some possible embodiments, referring to FIGS. 4 and 5, a partition plate 25 is disposed in the middle of the panel 20, two spaced limiting grooves 26 are disposed in the partition plate 25, a limiting protrusion 32 is disposed at the end, close to the partition plate 25, of the turnover cover 30, the limiting protrusion 32 may be driven to rotate between the two limiting grooves when the turnover cover 30 rotates, thus it is limited that the turnover cover 30 only may rotate to a vertical state from a horizontal state relative to the panel 20, furthermore, the limiting protrusion 32 presses the part, between two limiting grooves 26, of the limiting partition plate 25 in the rotating process, so as to generate friction resistance relative to the limiting protrusion 32, thus avoiding that the turnover cover 30 rotates autonomously to cause the problem of hand injury by crashing under the condition without external force.

In some possible embodiments, referring to FIGS. 3-5, two turnover covers 30 are available, which are symmetrically disposed on two sides of the partition plate 25, respectively, one semi-circular gap is formed at one end of the turnover cover 30, the other semi-circular gap is formed in the panel 20, and the two semi-circular gaps define the wiring hole 22 after the turnover cover 30 rotates to the horizontal state, and the wire may penetrate from the wiring hole 22.

The above is only the specific implementation modes of the application and not intended to limit the scope of protection of the application. Any variations or replacements within the technical scope disclosed by the application shall fall within the scope of protection of the application. Therefore, the scope of protection of the application shall be subject to the scope of protection of the claims.

The invention claimed is:

1. A power supply wiring apparatus, comprising:
   a base, which is fixedly installed on a rear shell of a power supply;
   a panel, which slidably covers the base, a wiring hole is formed in the panel, and a box cavity is formed between the panel and the base; wherein
   a sliding kidney-shaped hole along the vertical direction is disposed on a side wall of the base, an installing post is disposed on the panel, and the installing post may penetrate into the sliding kidney-shaped hole and is closely matched with the sliding kidney-shaped hole;
   wherein an outer diameter size of the installing post is greater than or equal to a width size of the sliding kidney-shaped hole;
   wherein two sliding kidney-shaped holes are available, which are respectively disposed on two opposite side walls of the base in a staggered mode.

2. The power supply wiring apparatus according to claim 1, wherein limiting holes are formed in both the upper end and a lower end of the sliding kidney-shaped hole, and a aperture of the limiting hole is greater than the width size of the sliding kidney-shaped hole and also greater than the outer diameter size of the installing post.

3. The power supply wiring apparatus according to claim 1, wherein a turnover cover is hinged on the panel, and the turnover cover may rotate relative to the panel until it is covered horizontally or opened vertically with the panel.

4. The power supply wiring apparatus according to claim 3, wherein a hinge hole is formed in the panel, a hinge column which may be disposed in the hinge hole in a penetrating mode is disposed on the turnover cover, an inner protrusion is formed on an upper portion of the panel, and the turnover cover may rotate till being horizontally lapped on the inner protrusion.

5. The power supply wiring apparatus according to claim 3, wherein a partition plate is disposed in a middle of the panel, two spaced limiting grooves are disposed in the partition plate, a limiting protrusion is disposed at the end, close to the partition plate, of the turnover cover, the limiting protrusion may rotate between the two limiting grooves along with the turnover cover, and the limiting protrusion is pressed to generate elastic deformation in the rotating process.

6. The power supply wiring apparatus according to claim 5, wherein two turnover covers are available, which are symmetrically disposed on two sides of the partition plate, respectively, one semi-circular gap is formed at one end of the turnover cover, the other semi-circular gap is formed in the panel, and the two semi-circular gaps define the wiring hole after the turnover cover rotates to the horizontal state.

* * * * *